L. BETHKE.
SPROCKET CHAIN.
APPLICATION FILED FEB. 26, 1919.

1,338,808.  Patented May 4, 1920.

Inventor
Leo Bethke
by John S. Barker
Attorney.

UNITED STATES PATENT OFFICE.

LEO BETHKE, OF MILWAUKEE, WISCONSIN, ASSIGNOR TO CHAIN BELT COMPANY, OF MILWAUKEE, WISCONSIN, A CORPORATION OF WISCONSIN.

SPROCKET-CHAIN.

1,338,808.  Specification of Letters Patent.  Patented May 4, 1920.

Application filed February 26, 1919.  Serial No. 279,293.

*To all whom it may concern:*

Be it known that I, LEO BETHKE, a citizen of the United States, residing at Milwaukee, in the county of Milwaukee and State of Wisconsin, have invented certain new and useful Improvements in Sprocket-Chains, of which the following is a specification.

This invention relates to sprocket chains formed of integral cast links united by pintles, where the links are each formed of a pair of side bars united at one end by a hollow tubular cross or end bar through which passes a pintle, the ends of which are seated in the free ends of the side bars of the adjacent link that overlaps the ends of the said cross bar; and where, also, there are interlocking parts carried by the links, located concentric with the pintles and adapted to take from them some of the strain and wear. A good example of a chain of this type is found in Patent 670,285, March 19, 1901, to Christopher W. Levalley. This has been a popular type of chain and largely manufactured and used. Under certain conditions, however, particularly where the wear and strain have been great, certain weaknesses have developed in the form of chain shown in the patent referred to and it is the object of the present invention to improve the said chain so as to retain all its good points and at the same time add to its strength and effectiveness.

Figure 1:
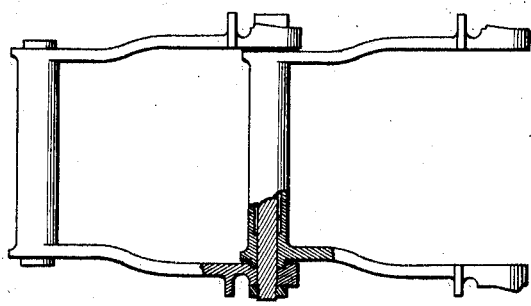
Figure 2:
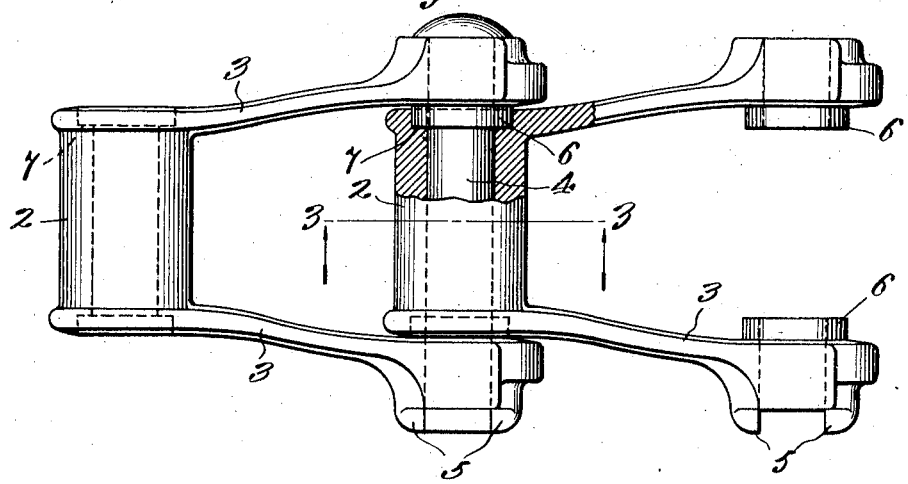

In the accompanying drawings I have illustrated in Figure 1 the chain of the patent referred to, such view being a plan, partly in section, of two links of the chain. Fig. 2 is a similar view of a chain embodying my improvements and Fig. 3 is a transverse sectional view on the line 3—3 of Fig. 2.

Figure 3:
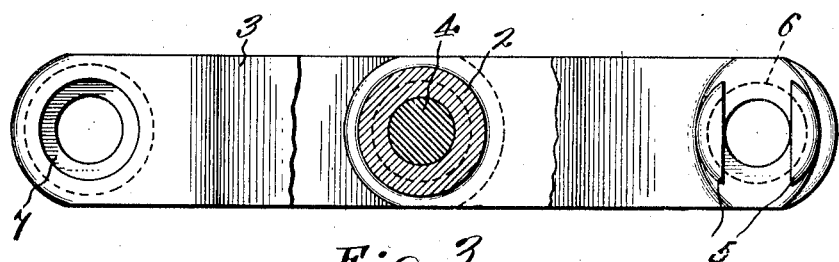

Referring to Figs. 2 and 3 of the drawings, 2 indicates the cross or end bar of the link, and 3, 3 the side bars thereof these being preferably cast integral. The end bar, and the free ends of the side bars are perforated to receive the connecting pintle 4. This is held from rotation in the side bars by suitable means, such as the lugs 5. Extending inwardly from the free ends of the side bars 3, and concentric with the pintle seats therein, are cylindrical projections 6. These are adapted to lie within recesses 7 formed in the outer faces of the ends of the cross or end bar 2 and shaped to fit the projections 6. The links of the chain may be formed with the free ends of the side bars sufficiently far apart to permit the end bar of a link to be slipped between the faces of the projections 6, which are then forced into the recesses 7 and there held by a pintle, when its ends are riveted or it is otherwise secured in place to unite the links in the formation of the chain. Or else the links may be formed with the free ends of the side bars closer together so that in coupling the links they have to be forced apart to allow an end bar to be passed between the projections 6, after which the side bars will be moved inwardly and toward the end bar to cause the projections 6 to enter the seats 7, prior to being united by the pintles. Whichever way of manufacture or assembly be adopted is immaterial so far as the invention is concerned, as the resulting chain is the same in either case.

The advantages of a chain made according to the present invention as compared with one of the older type shown in Fig. 1 are decided. It develops in use that the weak parts of a chain such as shown in Fig. 1 are the side bars where perforated to form the pintle seats. It is here that the links give way, if at all, and as they sometimes do under heavy working conditions met with in use. By forming the projections 6 on the inner faces of the free ends of the side bars and concentric with the pintle seats the chain is strengthened at its weakest parts and at the same time the articulating projections, desirable in chains of this kind, are provided. Furthermore in chains made as illustrated in Fig. 1 the seats in the side bars of the links for the ends of the pintles are so short that the pintles sometimes bend for want of proper longitudinal support at these points. The pintle seats in the cross bar are always of sufficient size to give proper support to the pintles. Indeed the entire length of the perforation through the cross bar is not utilized as a bearing for the pintle, but only the end portions thereof, the central part of the perforation being enlarged to form an oil cavity as represented in Fig. 1 and described in the aforesaid patent. But by the arrangement shown in Figs. 2 and 3 the relative sizes of the bearings for the pintles at each articulation in the chain are made more nearly equal and are so proportioned that weakness is avoided and excessive wear at any one circumferential surface is reduced.

What I claim is:

1. An integral cast metal link for a sprocket chain comprising a perforated end bar and side bars, the side bars being perforated near their free ends and having on their inner faces tubular projections concentric with the perforations therein, and the end bar having formed in its ends concentric with the perforation therein recesses adapted to receive and fit the projections of another link that may be united thereto.

2. A sprocket chain formed of links such as described in claim 1, having pintles uniting the links and seated at their ends in the side bars and at their intermediate portions in the end bars.

3. A sprocket chain of pintle connected links having side bars and end cross bars, the side bars being formed with inwardly extending cylindrical projections and the end bars being formed at their ends with recesses to receive the said projections, the side bars and end bars being perforated for the passage of the connecting pintles concentric with the said projections and recesses.

LEO BETHKE.